US011789177B2

(12) United States Patent
Hokstad

(10) Patent No.: US 11,789,177 B2
(45) Date of Patent: Oct. 17, 2023

(54) METHOD OF CALCULATING TEMPERATURE AND POROSITY OF GEOLOGICAL STRUCTURE

(71) Applicant: Equinor Energy AS, Stavanger (NO)

(72) Inventor: Ketil Hokstad, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 529 days.

(21) Appl. No.: 16/617,383

(22) PCT Filed: Jun. 1, 2018

(86) PCT No.: PCT/NO2018/050145
§ 371 (c)(1),
(2) Date: Nov. 26, 2019

(87) PCT Pub. No.: WO2018/222054
PCT Pub. Date: Dec. 6, 2018

(65) Prior Publication Data
US 2021/0018652 A1    Jan. 21, 2021

(30) Foreign Application Priority Data
Jun. 1, 2017   (GB) .................................. 1708748.7

(51) Int. Cl.
*G01V 11/00*      (2006.01)
*G01V 99/00*      (2009.01)
(Continued)

(52) U.S. Cl.
CPC .............. *G01V 11/00* (2013.01); *E21B 47/00* (2013.01); *E21B 47/07* (2020.05); *E21B 49/003* (2013.01);
(Continued)

(58) Field of Classification Search
CPC ........ G01V 11/00; G01V 1/48; G01V 99/005; G01V 2210/614; G01V 2210/6169;
(Continued)

(56) References Cited

U.S. PATENT DOCUMENTS 8,090,555 B2 *   1/2012   Dai .......................... G01V 1/30
                                                                702/6
2008/0319674 A1  12/2008  Dai et al.
(Continued)

FOREIGN PATENT DOCUMENTS

GB          2518412 A       3/2015
JP       2010530976 A       9/2010
(Continued)

OTHER PUBLICATIONS

Agemar, Thorsten, Josef Weber, and Rüdiger Schulz. "Deep geothermal energy production in Germany." Energies 7.7 (2014). pp. 4397-4416. (Year: 2014).*
(Continued)

*Primary Examiner* — John E Johansen
(74) *Attorney, Agent, or Firm* — Eversheds Sutherland (US) LLP

(57) ABSTRACT

A method of calculating the temperature and/or porosity of a geological structure, wherein there is provided at least two geophysical parameters of the geological structure, the method including inverting the at least two geophysical parameters to estimate the temperature and/or porosity of the geological structure.

25 Claims, 1 Drawing Sheet

(51) Int. Cl.
  *E21B 47/00* (2012.01)
  *E21B 47/07* (2012.01)
  *E21B 49/00* (2006.01)
  *G06F 17/11* (2006.01)
  *G01V 1/48* (2006.01)

(52) U.S. Cl.
  CPC .............. *G01V 1/48* (2013.01); *G01V 99/005* (2013.01); *G06F 17/11* (2013.01); *E21B 2200/20* (2020.05); *G01V 2210/614* (2013.01); *G01V 2210/6169* (2013.01); *G01V 2210/6244* (2013.01); *G01V 2210/665* (2013.01)

(58) Field of Classification Search
  CPC ...... G01V 2210/6244; G01V 2210/665; E21B 47/07; E21B 47/00; E21B 49/003; E21B 2200/20; G06F 17/11
  USPC ........................................................ 703/2, 10
  See application file for complete search history.

(56) References Cited

U.S. PATENT DOCUMENTS

| | | | |
|---|---|---|---|
| 2010/0185422 | A1 | 7/2010 | Hoversten |
| 2014/0297187 | A1 | 10/2014 | Miotti et al. |
| 2014/0365193 | A1 | 12/2014 | Biegert et al. |
| 2015/0032426 | A1 | 1/2015 | Chen et al. |
| 2016/0313443 | A1 | 10/2016 | Al-Shuhail et al. |
| 2018/0203151 | A1* | 7/2018 | Kouchmeshky ......... G01V 3/30 |

FOREIGN PATENT DOCUMENTS

| | | | | |
|---|---|---|---|---|
| WO | 2012166228 | A1 | 12/2012 | |
| WO | 2013012470 | A1 | 1/2013 | |
| WO | 2014029415 | A1 | 2/2014 | |
| WO | 2015065651 | A1 | 5/2015 | |
| WO | 2016123014 | A1 | 8/2016 | |
| WO | 2017074884 | A1 | 5/2017 | |
| WO | WO-2017074884 | A1 * | 5/2017 | ............ E21B 47/06 |
| WO | 2017142422 | A1 | 8/2017 | |
| WO | 2018106927 | A1 | 6/2018 | |

OTHER PUBLICATIONS

Search Report, EP19910217.2, dated Feb. 8, 2021 (178 pp.).
Maliln, Peter, Well Targeting Using Joint Geophysical Methods: New Techniques for Exporation and Modelling, Institute of Earth Science and Engineering, University of Auckland, Undated (137 pp.).
Kristensen, Lars, et al., Pre-drilling assessments of average porosity and permeability in the geothermal reservoirs of the Danish area, Geotherm Energy, 2016 (27 pp.).
International Search Report and Written Opinion, PCT/NO2018/050145, dated Jul. 2, 2018 (11 pp.).
Search Report, GB1708748.7, dated Nov. 22, 2017 (6 pp.).
Hokstad, et al., We EL12 14, Integrated Basin-scale Thermal Modeling, Amsterdam, Jun. 2014 (5 pp.).
Maliln, Peter, Hydrothermal Fault Zone Mapping at Drafla Geothermal Field Using Seismic and Electrical Measurements, Imaging Fractures as Targes for Drilling, Abstract; section 2.2, 2.4.3; figure 7, 11-13 (www.geothermal-energy.org/pdf/IGAstandard/ISS/2008Bali/Peter_Malin.pdf, Apr. 2007 (137 pp.).
Manzella, Adele, The Role of Magnetotellurics in Geothermal Exploration, National Research Council of Italy, 2016 (32 pp.).
Search Report, EP18810217.2, dated Jan. 28, 2021 (14 pp.).
Examination Report for EP 18810217.2, dated Jun. 28, 2022 (14 pp.).
Office Action for EP 18 810 217.1, dated Jun. 29, 2023 (14 pp.).
Mahmoodi, Omid, et al., "Using constrained inversion of gravity and magnetic field to produce a 3D litho-prediction model", Geophysical Prospecting, vol. 65, pp. 1662-1679, 2017 (18 pp.).

* cited by examiner

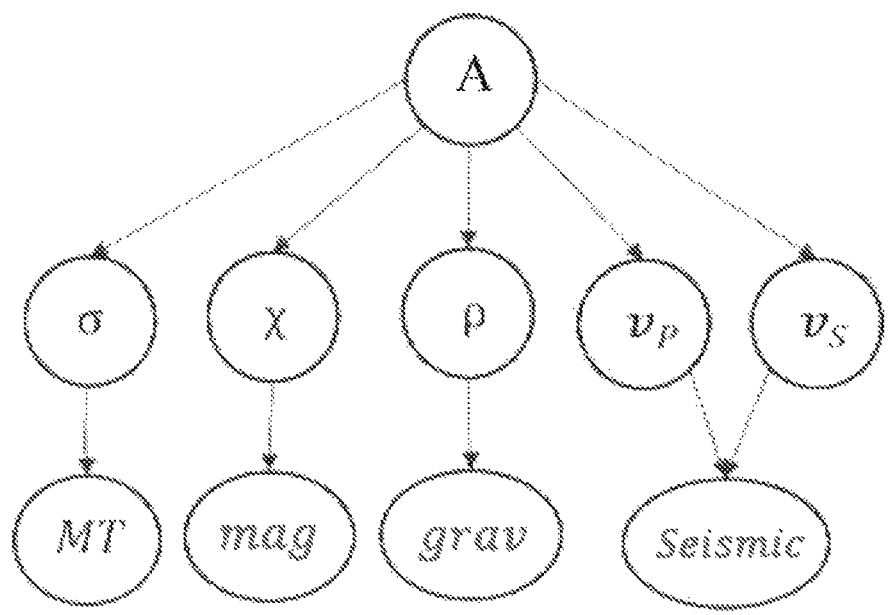

METHOD OF CALCULATING TEMPERATURE AND POROSITY OF GEOLOGICAL STRUCTURE

TECHNICAL FIELD

The present invention provides a method of calculating the temperature and/or porosity of a geological structure, a method of prospecting for geothermal energy and a method of harnessing geothermal energy.

BACKGROUND OF THE INVENTION

Predictions or knowledge of temperatures and porosities within the Earth are of major importance for the geothermal energy industry. The drilling of wells for harnessing geothermal energy is expensive and time consuming, and it is therefore important to estimate prior to drilling where the best location for drilling is, what the best direction to drill is, and what depth to drill to. Knowledge of temperatures and porosities can be of use when deciding where to drill wells.

In the prior art, the temperature or porosity of geological formations has been found using single domain inversions of one geophysical parameter. However, these single domain inversions do not give quantitative estimates of subsurface temperature or porosity. There is therefore a need for an improved method for estimating temperature or porosity in a geological structure.

SUMMARY OF THE INVENTION

In one aspect, the invention provides a method of calculating the temperature and/or porosity of a geological structure, wherein there is provided at least two geophysical parameters of the geological structure, the method comprising: inverting the at least two geophysical parameters to estimate the temperature and/or porosity of the geological structure; and using the calculated temperature and/or porosity in the decision-making process for the drilling of a geothermal well.

The inventors have found that the temperature and/or porosity of a geological structure can be found by inverting at least two geophysical parameters of the geological structure, such as electrical resistivity (or conductivity), density, seismic velocity (which may be seismic p-wave and/or s-wave velocity) or magnetic susceptibility. This method is advantageous as it does not require detailed sampling of the geological structure to find the temperature and/or porosity throughout the geological structure. Rather, since geophysical parameter values can be obtained throughout a geological structure by surface measurements and observations, the method of the present invention allows temperature and/or porosity to be calculated using surface measurements and observations.

Inverting or inversion is a well-known term in the art. It describes the process of calculating, from at least one observed/measured parameter, the cause of the parameter (or at least one of the causes of the parameter). Thus, in the present case, physically speaking, the temperature and/or porosity affect the geophysical parameters. However, it is the geophysical parameters that are measured and not the temperature and/or porosity. Calculating the temperature and/or porosity from the geophysical parameter(s) may therefore be described as inverting. The inversion may be considered to be a calculation that uses two or more models (such as rock physics models), such as the forward models discussed below. The two or more models respectively directly relate the two or more geophysical parameters to the temperature and/or porosity to calculate the temperature and/or porosity value directly from the two or more geophysical parameters.

The method may comprise using both the calculated temperature and the calculated porosity in the decision-making process for the drilling of a geothermal well.

In the present method, the temperature and/or porosity may be output directly from the inversion of the geophysical parameters. This may mean that the inversion calculation does not output an intermediate parameter (such as radiogenic heat production, or basal heat flow, or any other parameter other than temperature and/or porosity) from which the temperature and/or porosity may then be found. This may mean that the respective forward models used in the present method relate the respective geophysical parameters directly to the temperature and/or porosity.

Throughout the specification, terms such as "calculating" and "estimating" are used. These are not intended to be limiting; rather they are merely meant to mean determining or obtaining a value for an actual physical value (or at least a (close) approximation or estimate of the physical value), such as temperature and/or porosity.

A geophysical parameter may be any property of the geological structure. Particularly, the geophysical parameters may be a value(s) describing respective properties of the geological structure. Particularly, the geophysical parameters may describe any properties that are affected by the temperature and/or porosity of the geological structure. The at least two geophysical parameters may be two or more of density, magnetic susceptibility, seismic velocity (such as seismic p-wave velocity and/or s-wave velocity), electric conductivity, electric resistivity or magnetic remanence, Any combination of magnetic susceptibility, electric conductivity, electric resistivity, magnetic remanence, density, seismic velocity, seismic p-wave velocity or seismic s-wave velocity (or any other geophysical parameter on which the temperature and/or porosity is dependent) may be used. In one example, electrical conductivity (or resistivity) and density may be used.

When calculating the temperature (and/or possibly the porosity), the electrical conductivity (or resistivity) may be the most important parameter to include in the inversion, since it may be that the geophysical parameter that varies most directly to changes in temperature is the electrical conductivity (or resistivity). Of course, it does not need to be included, but it is preferable that it is. Therefore, electromagnetic data (such as magnetotelluric data) from which the electrical conductivity (or resistivity) can be found by inversion (see below) may be the most important geophysical data to have acquired.

The inverting step may comprise selecting respective forward models that define respective relationships between the at least two geophysical parameters and the temperature and/or porosity of the geological structure. There may be respective forward models that define a relationship between the at least two geophysical parameters and the temperature. There may be respective forward models that define a relationship between the at least two geophysical parameters and the porosity.

The respective forward models that define the relationships between the respective geophysical parameters and the temperature may be different to the respective forward models that define the relationships between the respective geophysical parameters and the porosity. Alternatively, the respective forward models that define the relationships between the respective geophysical parameters and the temperature may be the same as the respective forward models that define the relationships between the respective geophysical parameters and the porosity.

In inversion calculations, a forward model is a relationship between the known/measured parameter (the geophysical parameter in this case) and the unknown quantity (the temperature and/or porosity in this case).

The respective forward models may be selected based upon expected trends relating the geophysical parameter in question to temperature and/or porosity. For instance, the geophysical parameter may generally increase or decrease (depending on the geophysical parameter) with increasing temperature and/or porosity.

When the geophysical parameter is density or electric resistivity, the geophysical parameter may decrease with increasing temperature and/or porosity. When the geophysical parameter is magnetic susceptibility, the geophysical parameter may increase with increasing temperature below the Curie temperature, and decrease with increasing temperature above the Cure temperature (according to the Curie-Weiss law). When the geophysical parameter is magnetic susceptibility, the geophysical parameter may increase with increasing porosity.

The specific forward model used is not essential to the present invention, with several such forward models being known in the art, and the skilled person would be aware of which models could be used. Indeed, different forward models may be used to achieve similar results, as long as the forward models are able to model the general trend between the respective geophysical parameters and the temperature and/or porosity.

When the geophysical parameter decreases with increasing temperature and/or porosity, the model may be a decaying function, e.g. a decaying exponential function such as the Arrhenius equation (which may be used to describe the electric conductivity and/or resistivity of dry basalt, for example). When the geophysical parameter increases with increasing temperature and/or porosity, the model may be a sigmoid function (e.g. for induced magnetisation or susceptibility below the Curie temperature) or exponential function or linear function.

Thus, as can be understood from the above, the precise forward model can be selected by the skilled person based upon knowledge of rock physics relations.

As one possible example, the forward model that relates temperature to conductivity for basaltic rock may be the log of conductivity vs. the inverse temperature (e.g. $\ln(\sigma) \propto 1/T$), e.g. as in the Arrhenius equation.

Conductivity may be modelled using the Waxman-Smits equation, for example (Mavko, G., Mukerji, T., and Dvorkin, J., 2009. The Rock Physics Handbook, 2nd Edition, Cambridge Univ. Press; Usher, G., Harvey, C., Johnstone, R., and Anderson, E., 2000. Understanding the Resistivities Observed in Geothermal Systems: In: Proceedings of the World Geothermal Congress, Kyushu-Tohoku, Japan, May 28-June 10).

Preferably, the respective model relationships between temperature and the respective geophysical parameters are not dependent on any other variable, such as any other geophysical parameters. Preferably, the respective model relationships between porosity and the respective geophysical parameters are not dependent on any other variable, such as any other geophysical parameters. Preferably, the respective model relationships between temperature and porosity and the respective geophysical parameters are not dependent on any other variable, such as any other geophysical parameters. Of course, other constant factors may be present, but there is preferably only one variable. As is discussed below, the constant factors may be found by calibration with data.

It should be understood that the models may not show the full complexity of the system, i.e. each model may be intentionally simplified such that the geophysical parameter is dependent only on the temperature and/or porosity. In reality, geophysical parameters generally depend on many variables. However, in the models used in the present method, the geophysical parameters may only depend on the variable of interest, which in this case is temperature and/or porosity.

There may be provided calibration data comprising at least one measurement of each of the at least two geophysical parameters and the temperature and/or porosity of the geological structure. This data may be taken, for example, from a sample of the geological structure. The method may further comprise obtaining the calibration data. The calibration data may preferably contain a plurality of measurements of each of the at least two geophysical parameters and the temperature and/or porosity of the geological structure.

The method may comprise optimising the forward models based on the calibration data. This optimisation may comprise using the calibration data to find the optimal values of the constant factors in the forward models. Typically, the greater the amount of calibration data, the better the optimisation will be.

In order to optimise each forward model, it may be assumed that each forward model (which calculates a geophysical parameter from a given temperature and/or porosity), relative to the provided geophysical parameter, has a certain error distribution (i.e. the difference between the provided/observed geophysical parameter and the geophysical parameter calculated by the respective forward model gives an error distribution). Preferably the error distribution is assumed to be a Gaussian error distribution, preferably with zero mean. Each forward model may be optimised by reducing the error distribution so that it is as small as possible, such as by having a mean of the error distribution to be as close as possible to zero and by having as small a variance of the error distribution as possible. The optimisation may be achieved by finding the value(s) of the constant factor(s) in the forward models that optimise the forward models.

The optimised forward models can then be used in the inversion to produce a more accurate inversion.

The forward models may be used in the inversion to calculate the probability distribution (and/or the mean and/or variance values (directly)) of the geophysical parameter, given a particular value of the temperature and/or porosity (see equation 10 below, for the temperature case). This probability distribution function may be used to calculate the probability distribution of temperature and/or porosity (and/or the mean and/or variance values (directly)), given particular values of the geophysical parameter (see equations 4-7 below, for the temperature).

As has been mentioned above, using at least two geophysical parameters may significantly constrain the inversion of the geophysical parameters to temperature and/or porosity. Using only one geophysical parameter to estimate temperature and/or porosity may leave large errors and uncertainties in the calculated temperature and/or porosity. However, the inventors have found that when other geophysical parameters are used in the same inversion to calculate the same temperature and/or porosity, the uncertainties may dramatically reduce. Indeed, the more geophysical parameters are used, the more accurate the calculated temperature and/or porosity may become. Thus, at least three, four or five geophysical parameters may be used in the inversion. There may be only one, two, three, four or five geophysical parameters used.

When calculating the temperature, the inverting step may comprise using a model in which there is statistical (conditional) independence between the at least two (or three, four, five, etc.) geophysical parameters and statistical dependence between each respective geophysical parameter and the temperature of the geological structure.

When calculating the porosity, the inverting step may comprise using a model in which there is statistical (conditional) independence between the at least two (or three, four, five, etc.) geophysical parameters and statistical dependence between each respective geophysical parameter and the porosity of the geological structure.

When calculating the temperature and porosity, the inverting step may comprise using a model in which there is statistical (conditional) independence between the at least two (or three, four, five, etc.) geophysical parameters and statistical dependence between each respective geophysical parameter and the temperature and porosity of the geological structure.

By "model" here, it may simply mean the mathematical relationships used in the inversion, such as the forward models relating the respective geophysical parameters to the temperature and/or porosity.

The statistical dependence of the temperature and/or porosity on the different geophysical parameters and the statistical (conditional) independence of different geophysical parameters on each other is an important concept that the inventors have discovered. By modelling the inversion problem in this way, it allows for the geophysical parameters and the temperature and/or porosity to be viewed as a network, in which the use of multiple geophysical parameters constrains the values found for the temperature and/or porosity and so reduces errors/uncertainties in the temperature and/or porosity.

Using this assumption, and using such a model, the relationship between the geophysical parameters and the temperature and/or porosity can be described in terms of a Bayesian network, which can be shown on a directed acyclic graph (DAG), such as FIG. 1. Thus, the present inversion may be a Bayesian formulation of the inversion problem. The inversion may be performed in a Bayesian statistical setting. The inversion from geophysical parameters to temperature and/or porosity may not be a single domain inversion.

Expressed differently, the mathematical relationships that are used in the inversion may be selected based on the assumption that the probability of the temperature and/or porosity is separately conditional on each of the respective geophysical parameters, and there is no conditional probability between the geophysical parameters.

Performing the inversion in the Bayesian setting as discussed above allows for an accurate estimate of the uncertainty in the calculated temperature and/or porosity value to be found. Thus, the method may comprise finding the uncertainty in the calculated temperature and/or porosity.

The inverting step may comprise selecting a forward model for each respective geophysical parameter. The forward models may define respective relationships between the respective geophysical parameters and the temperature of the geological structure. The forward models may define respective relationships between the respective geophysical parameters and the porosity of the geological structure. The forward models may define respective relationships between the respective geophysical parameters and the porosity and temperature of the geological structure.

Different forward models may be used for each geophysical parameter, relating each geophysical parameter to temperature. Different forward models may be used for each geophysical parameter, relating each geophysical parameter to porosity. Different forward models may be used for each geophysical parameter, relating each geophysical parameter to temperature and porosity.

There may be provided at least two types of geophysical data of the geological structure, the method comprising inverting the at least two types of geophysical data to calculate the at least two respective geophysical parameters.

When the geophysical parameter is density, seismic velocity (such as seismic p-wave or s-wave velocity), magnetic susceptibility, electrical conductivity (or electric resistivity), or magnetic remanence, the geophysical data type may be gravity data, seismic data, electromagnetic data (such as magnetotelluric data), or magnetic data respectively.

The data may be gathered using known techniques, such as seismic data acquisition, magnetotelluric acquisition, etc. The method may comprise gathering/obtaining the geophysical data.

The data may have been acquired prior to any drilling, in which case the geophysical data may be considered to be pre-drilling geophysical data. This data may be used to provide a pre-drilling estimate of the temperature and/or porosity. Additionally or alternatively, the geophysical data may have been gathered during (or after) the drilling of a well. This may be used to provide a during-drilling or post-drilling estimate of the temperature and/or porosity, which may be considered to be an update to the existing estimates.

The method may comprise acquiring the geophysical data prior to drilling. Additionally or alternatively, the method may comprise acquiring the geophysical data during drilling (such as through one or more well logs in the partially-drilled well). Additionally or alternatively, the method may comprise acquiring the geophysical data after the drilling of the well (such as through one or more well logs in the well). The data acquired during or after the drilling may be or comprise temperature data (i.e. a direct measurement of the temperature), which could be used to update previous temperature estimates (e.g. the pre-drilling estimate, or a previous during-drilling estimate) by offering a further constraint to the inversion problem.

The method may comprise calculating the temperature and/or porosity prior to a drilling operation.

Additionally or alternatively, the method may comprise calculating the temperature and/or porosity during a drilling operation. This may be considered to be an update to the pre-drilling temperature and/or porosity calculation.

Additionally or alternatively, the method may comprise calculating the temperature and/or porosity after the well has been drilled. This may be considered to be an update to the pre-drilling and/or during-drilling temperature and/or porosity calculation.

Inverting geophysical data to calculate each of the geophysical parameters can be performed using known techniques, such as single-domain inversion or joint inversion of the respective geophysical data type for each respective geophysical parameter. This inversion may be 2D or 3D inversion. For example, when gravity and magnetic data are to be inverted to density and magnetic susceptibility, a standard Gravmag inversion technique may be used, such as that provided for by the Geosoft software. The skilled person would know numerous inversion methods for inverting geophysical data to geophysical parameters, and these need not be discussed in the present application. The respective forward models used in the inversion of the geophysical data to the respective geophysical parameters may be known or derived from physical principles such as Maxwell's equations for electromagnetic data types, Newton's laws of gravity for gravity data, and the elastic wave equation for seismic data.

As has been discussed above, the at least one geophysical parameter may be any geophysical parameter which is dependent on temperature and/or porosity, but is preferably independent of, or can be modelled as conditionally independent of, other geophysical parameters, such as density, seismic velocity (e.g. seismic p-wave or s-wave velocity), magnetic susceptibility, electrical conductivity, electric resistivity or magnetic remanence. Any other property of the geological structure that can be expressed as a parameter and which is dependent on temperature and/or porosity (and preferably can be expressed as dependent on temperature and/or porosity whilst being independent of any other geophysical parameter/variable) can be used. Any combination of any number of such parameters may be used.

Well log data, if available, may be used to constrain the inversion calculation of the temperature and/or porosity. This may be acquired during or after the drilling of a well. The well log data may comprise gravity data, seismic data, electromagnetic data (such as magnetotelluric data), and/or magnetic data, and it may also comprise temperature and/or porosity measurements.

When the method is for calculating the temperature (only) of the geological structure, porosity data can be included as a parameter in the inversion. The inversion calculation from the geophysical parameters to the temperature can be constrained using the porosity data. The porosity data may be a trend of porosity vs. depth.

Likewise, when the method is for calculating the porosity (only) of the geological structure, temperature data can be included as a parameter in the inversion. The inversion calculation from the geophysical parameters to the porosity can be constrained using the temperature data. The temperature data may be a trend of temperature vs. depth It should be appreciated that the above methods may calculate the temperature and/or porosity for a specific point/location/volume/space of the geological structure, said point/location/volume/space corresponding to the point/location/volume/space of the geophysical parameter used in the inversion step (the geophysical parameter(s) used in these methods may be the value of that parameter at a given point/location/volume/space in the geological structure). Therefore, in order to obtain the spatially dependent temperature and/or porosity function $A(x, y, z)$, the above inversion method may be performed pointwise for multiple different points/locations/volumes/spaces in the geological structure. As can be appreciated, the geophysical parameter(s) may vary over the space of the geological structure, and this may correspond to a spatially varying temperature and/or porosity.

Thus, the method may comprise constructing a spatially dependent temperature and/or porosity function, $A(x, y, z)$. This function may be constructed by calculating the temperature and/or porosity for different points/locations/volumes/spaces in the geological structure (preferably all points/locations/volumes/spaces in the geological structure). The temperature and/or porosity may be calculated over substantially the entirety of the geological structure, or over a particular area (xy) and depth (z). (As is standard in the art, the x and y axes are mutually perpendicular horizontal directions and the z axis is a vertical direction.)

The temperature and/or porosity may be found in three dimensions.

The temperature and/or porosity may be found as function depth, and possibly also horizontal location. This may provide the user with an estimate of the depth, and possibly also the horizontal location, of possible targets for drilling. Such a target may be supercritical water reservoir.

In a second aspect, the invention provides a method of producing a temperature and/or porosity model of a geological structure comprising any of the methods of the first aspect.

As can be appreciated, the above methods may be used when prospecting for geothermal energy, e.g. when planning and performing geothermal well drilling operations.

In a third aspect, the invention provides a method of prospecting for geothermal energy comprising performing any of the methods of any of the first or second aspects and using the calculated temperature and/or porosity in the decision-making process for the drilling of a geothermal well.

The calculated temperature and/or porosity may be used prior to drilling the well, e.g. when deciding where to drill the well and/or how deep to drill the well. The temperature and/or porosity calculation may provide the user of the method with a temperature and/or porosity vs. depth estimate, which can be used to decide where to drill.

Additionally or alternatively, the calculated temperature and/or porosity may be used during or after the drilling of the well, e.g. when deciding in which direction or to which depth to continue drilling. This may particularly be the case where geophysical data is gathered during or after the drilling of the well, as discussed below.

The method may comprise performing a calculation of the temperature and/or porosity prior to drilling. This may be referred to as a pre-drilling calculation. The pre-drilling calculation may be used to decide where to begin drilling.

The method may comprise drilling the geothermal well.

The method may comprise acquiring new geophysical data during drilling. This new data may be for the same geophysical parameters as were used in pre-drilling calculation. However, additionally or alternatively, this new data may be for different geophysical parameters as were used in the pre-drilling calculation. For instance, the new data may additionally or alternatively comprise direct measurement of temperature and/or porosity from within the well. There may be new data for at least one, or preferably at least two, geophysical parameters. These geophysical parameter(s) may be of the conditionally independent type discussed above in relation to the first aspect. The new geophysical data may be gathered from the partly-drilled well, such as by taking one or more well logs during drilling.

The method may comprise inverting said new geophysical data to find corresponding new geophysical parameter(s). This may the inversion from geophysical data to geophysical parameter as discussed above in relation to the first aspect. Where direct temperature and/or porosity data have been acquired from the well, this data may be used to constrain the inversion calculation.

The method may comprise inverting said new geophysical parameter(s) to provide updated estimates of the temperature and/or porosity. Where there are two or more new geophysical parameters found during drilling, these may be the only geophysical parameters used in the inversion. However, the new geophysical parameter(s) can also be inverted with one or more of the geophysical parameters used in the pre-drilling calculation. This inversion step may comprise any of the features discussed in relation to the inversion of the geophysical parameters to estimate temperature and/or porosity discussed in relation to the first or second aspects.

The steps of acquiring new geophysical data and inverting it to find updated estimates of the temperature and/or porosity may be repeated throughout the drilling process.

The updated estimates of the temperature and/or porosity may be used during the drilling process in the drilling decision making process, such as deciding what direction to drill in and how deep to drill and whether to stop drilling. Thus, a more educated drilling process can be carried out using the present method.

In a fourth aspect, the invention provides a method of harnessing geothermal energy. This method may comprise performing any of the methods of any of the first, second or third aspects. The method may comprise harnessing geothermal energy from the geothermal well. The harnessing of geothermal energy from the geothermal well can be performed using any known technique, such as heating a fluid circulated through the well and/or generating electricity.

In a fifth aspect, the invention provides a computer program product comprising computer readable instructions that, when run on a computer, is configured to cause a processes to perform any of the above methods.

Preferred embodiments of the invention will now be discussed, by way of example only, with reference to the accompanying drawings, in which:

BRIEF DESCRIPTION OF THE DRAWING

FIG. 1 shows a Bayesian network (a DAG) representing the model relationship between temperature A and geophysical parameters $\{\sigma, \chi, \rho, v_p, v_s\}$. As shown in FIG. 1, the geophysical parameters in turn depend on geophysical data (like magnetotelluric data (MT), magnetic data (mag), gravity data (grav), and seismic data (Seismic)) which can be included in an extended Bayesian network.

DETAILED DESCRIPTION

As is shown in the exemplary method below, the estimation of subsurface temperature is addressed, using inversion of at least two geophysical parameters. As a general workflow of this method, firstly geophysical parameters are obtained by single-domain inversion of respective geophysical data types. This may be 2D or 3D inversion. For instance, the geophysical data types may be two or more of magnetotelluric data (MT), magnetic data (mag), gravity data (grav), and seismic data (Seismic). When these data are inverted, they may find the following respective parameters: electric resistivity (or conductivity) ($\sigma$) from magnetotelluric data (MT); magnetic resonance ($\chi$) from magnetic data (mag); density ($\rho$) from gravity data (grav); p-wave velocity ($v_p$) from seismic data (Seismic); and s-wave velocity ($v_s$) from seismic data (Seismic).

Secondly, two or more of the geophysical parameters are inverted to obtain temperature using rock physics forward models. Forward models are illustrated schematically in FIG. 1 with the arrows connecting the temperature (A) with the geophysical parameters, and the respective geophysical parameters with the respective geophysical data types. For the seismic case the term inversion should be understood as either tomography or full-waveform inversion. For the magnetic and gravity data, the inversion is a Gravmag inversion, constrained on geometry.

In the exemplary method below, temperature is computed from geophysical inversion of three geophysical parameters: magnetic resonance ($\chi$), density ($\varphi$) and p-wave velocity ($v_p$). Of course, other parameters or combinations could also be used, as discussed above. A porosity vs. depth trend could also be used to constrain the inversion.

In the present method, it is assumed that the relationship between geophysical data and temperature or porosity can be modelled in terms of the Bayesian network, or directed acyclic graph (DAG), shown in FIG. 1.

The joint probability distribution for a Bayesian network is defined by the marginal distributions of the parent nodes and the conditional distributions for the children. The joint distribution for variables $(x_i, \ldots, x_n)$ is then given by $$p(x_i, \cdots, x_n) = \prod_i p(x_i \mid x_i^{Pa}), \tag{1}$$

where $x_i^{Pa}$ denote parent nodes. The top nodes of the network have no parents, Applying the general Bayesian factorization rule, Equation 1, to the DAG in FIG. 1, the joint probability of temperature and geophysical parameters can be written as $$p(A, m_1, \cdots, m_n) = \prod_{i=1}^{n} p(m_i \mid A) p(A; \lambda) \tag{2}$$

where the model parameters $m = \{\chi, \rho, v_p, v_s, \sigma\}$, $\chi$ is magnetic susceptibility, $\rho$ is mass density, $v_p$ is P-wave velocity, $v_s$ is S-wave velocity, $\sigma$ is electroconductivity (inverse of resistivity) and A is temperature. The prior distribution $p(A; \lambda)$ depends on the hyperparameter $\lambda$, to be discussed later. Using conditional independence of parameters $m_i$, the joint distribution in Equation 2 can also be written as $$p(A, m_1, \cdots, m_n) = p(A \mid m_1, \cdots, m_n) \prod_{i=1}^{n} p(m_i), \tag{3}$$

from equations 2 and 3 the posterior distribution for the temperature can be obtained, $$p(A \mid m_1, \cdots, m_n) = \prod_{i=1}^{n} \frac{p(m_i \mid A)}{p(m_i)} p(A; \lambda), \tag{4}$$

and substituting the actual parameters for $m_i$ gives the following equation, $$p(A \mid \chi, \rho, v_p) = \frac{p(\chi \mid A) p(\rho \mid A) p(v_P \mid A) p(A; \lambda)}{p(\chi) p(\rho) p(v_p)}. \tag{5}$$

When the posterior distribution of A is known, the posterior expectation and posterior variance is given by $$\mu_{A \mid \chi, \rho, v_p} = \int A p(A \mid \chi, \rho, v_p) dA, \tag{6}$$

$$\sigma_{A \mid \chi, \rho, v_p}^2 = \int [A - \mu_{A \mid \chi, \rho, v_p}]^2 p(A \mid \chi, \rho, v_p) dA. \tag{7}$$

It is equations 4-7 that are most useful for calculate the likely temperature for given geophysical parameters. However, as is clear from equation 4 and 5, in order to do so, it is necessary to know the likelihood functions $p(m_i|A)$ for each of the geophysical parameters $m_i$. Further it is necessary to know the prior distribution $p(A;\lambda)$. Methods of calculating these are given below.

Regarding the prior distribution $p(A;\lambda)$, in the present method it is assumed to be Gaussian, $$A \sim \mathcal{N}(\mu_A(\lambda), \sigma_A^2(\lambda)), \qquad (8)$$

where $\mu_A$, and $\sigma_A^2$ are the prior expectation and variance, respectively. The prior distribution incorporates the user's prior knowledge regarding the temperature, for instance that the temperature is usually within a relatively narrow range. The hyperparameter $\lambda$ reflects the user's prior knowledge about the geological setting. If the user's prior knowledge is sparse, the prior variance $\sigma_A^2$ should be correspondingly large.

Thus, the prior distribution may preferably be a statistical distribution, preferably a Gaussian distribution. Preferably, the mean and variance of the prior distribution is selected by the user based on the user's prior knowledge of the geological structure in question (e.g. knowledge of typical variances of temperature).

For the likelihood functions $p(m_i|A)$ on the right-hand side of Equations 4 and 5, these are calculated using forward models $F_i(A)$. The forward models are mathematical relationships that compute the relevant geophysical parameter $m_i$ for a given temperature A. Regarding the present method, it is assumed that each of the forward models $F_i(A)$ have respective Gaussian error distributions with zero mean, when compared with the respective measured/observed geophysical parameters, i.e.

$$m_i - F_i(A) = e_i \sim \mathcal{N}(0, \sigma_{ei}^2) \qquad (9)$$

In the present method, these forward models may be optimised using calibration data.

Once the optimal forward models have been found (by selecting the appropriate forward models and calibrating them), the maximum likelihood functions (i.e. the maximum likelihood of a geophysical parameter given a value of temperature, $p(m_i|A)$ in equations 4 and 5) are given explicitly by $$p(m_i | A) = \frac{1}{\sigma_e \sqrt{2\pi}} e^{-\frac{[m_i - F_i(A)]^2}{2\sigma_{ei}^2}} \qquad (10)$$

These maximum likelihood functions, together with the prior distribution discussed above are used in equations 4-7 to calculate the posterior distribution for the temperature given the measured/obtained geophysical parameters, $p(A_{|\chi, \rho, v_p})$, the posterior expectation and the posterior variance. It is in this way that the temperature is calculated, i.e. these quantities give the useful values of temperature. If porosity data is available, it may also be used to constrain the inversion calculation.

It should be appreciated that with a Bayesian formulation of the inversion problem, the present method honours the fact that the rock physics models (the forward models) do not perfectly describe the observations (calibration data). This imperfectness is accounted for by the error variance $\sigma_{ei}$ in the likelihood distributions given in Equation 10. This in turn provides a quantitative estimate of the posterior variance $\sigma_{A|\chi, \rho, v_p}^2$ of the temperature obtained by the inversion.

Thus, Equation 3 is effectively a univariate distribution for A, with posterior mean and posterior variance given by Equations 6 and 7.

It should also be appreciated that the above-described steps may merely have calculated temperature, A, for a specific point in the geophysical structure. This point is the location corresponding to the location of the value of the respective geophysical parameters that are used to calculate the temperature. Thus, preferably, all the geophysical parameters that are used in the above steps are taken from the same, or at least similar, locations in the geological structure.

In order to construct a view of temperature over a region, or the entirety, of the geological structure, the above steps for calculating are be carried out for different locations in the geological structure. However, the calibration of the forward models may only be carried out once, i.e. it need not be carried out for each different location. In some circumstance, the calibration may be carried out for each location.

Thus, the above-discussed rock physics inversion is thus applied point-wise to obtain the spatially varying temperature A(x, y, z).

Once the temperature has been calculated, it can be used in the decision-making process for drilling geothermal wells. Temperature may be calculated prior to drilling and used to determine where and how deep to drill the well. Updated temperature may also be calculated during drilling using new geophysical data measured in the partially-drilled well (such as well logs). The updated temperature can be used to decide what direction and depth to drill to, or whether continuing to drill is worthwhile, or whether a different well should be drilled.

The above method illustrated in FIG. 1 has been discussed in terms of calculating the temperature only. However, the porosity could also be found using a similar method, but by using different forward models.

A practical example of the use of the above method will now be presented.

The target of the "IDDP-2" ("Iceland Deep Drilling Project 2") well at Reykjanes is geothermal resources at supercritical temperatures. The drill site has been mapped by electromagnetic and gravimetric surveys and subsurface temperatures on the IDDP-2 drill site have been predicted by multigeophysical inversion, as described below.

For geothermal exploration in general, it is useful to predict the depth and temperatures of potential reservoir targets. For the IDDP-2 well in particular, it is of great interest to obtain an estimate of the drilling depth needed to fulfill the main objective of the project; reaching supercritical conditions. There is no reflection-seismic data available in the area to build a structural framework. Also, limited amount of core material was recovered. Hence, subsurface information must be assessed from other types of geophysical and geological data, including well and drilling data to characterize rock units in the well.

In summary, the multigeophysical inversion method was used to predict subsurface temperature. Electric resistivity from MT (magnetotelluric) inversion and density from gravity inversion were used to compute a predrill estimate of formation temperature for the IDDP-2 drilling target. Resistivity and core samples acquired while drilling were used to update the temperature estimate and to build a geological model. This information was subsequently passed on to the reservoir engineers for simulation of the hydrothermal system.

A statistical model was constructed for the dependence of geophysical model parameters on temperature, and in turn, the dependence of geophysical data on geophysical model parameters. This can be represented by the Bayesian network shown in FIG. 1, where A is temperature. The first set of dependencies was given by various rock physics relations. The second set of dependencies was given by differential equations, such as the Maxwell equations of electromagnetics, Newton's law of gravity, and the elastic wave equation.

As described above, going from the top to the bottom of the Bayesian network constitutes forward modeling, i.e., computing synthetic geophysical models and data, given a subsurface temperature distribution. Going from the bottom to the top constitutes performing Bayesian inversion. By inversion, geophysical model parameters and subsurface temperature can be computed from observed geophysical data. A pragmatic approach was taken utilising geophysical models obtained with various geophysical inversion methods, and computed by different groups of geophysicists and service providers. Hence, the Bayesian inversion was focused on the second stage of the inversion, computing subsurface temperature from 3D geophysical models. This was effectively a rock-physics inversion.

Given the Bayesian network (FIG. 1), and assuming conditional independence between the nodes not connected by arrows, the posterior probability distribution for the temperature could be written as $$p(T \mid m_i, \ldots, m_n; \varphi) = C \prod_{i=1}^{n} p(m_i \mid T; \varphi) p(T) \tag{11}$$

where T is temperature, $m_i$ are the geophysical model parameters of interest, C is the normalization constant, and $\varphi$ is porosity. As described above, the porosity can be treated as a stochastic variable (in the same way as temperature T). However, in the present case, the porosity was assumed to be a hyperparameter, with a given deterministic value. The prior distribution for temperature is denoted p(T).

One or more geophysical parameters can be used to compute the posterior distribution. For instance, electric conductivity (or resistivity) may be used alone. However, as is evident from Equation 11, the product of two (or more) likelihood functions makes the posterior distribution narrower. This implies better posterior mean and smaller variance. Thus, in accordance with the invention two or more physical parameters were used to compute the posterior distribution.

Assuming Gaussian errors, the likelihood distribution for each geophysical parameter, can be written as $$p(m_i \mid T; \varphi) = \frac{1}{|2\pi \Sigma_{ei}|^{\frac{1}{2}}} e^{-[m_i - F_i(T;\varphi)]^T \Sigma_{ei}^{-1} [m_i - F_i(T;\varphi)]} \tag{12}$$

where $F_i(T; \varphi)$ is the rock-physics relation for the dependence of model parameter $m_i$ on temperature, and $\Sigma_{ei}$ is the corresponding error covariance. In this way, the fact that the rock physics models are not perfect representations of the subsurface properties may be accounted for. Equation 12 is a Gaussian distribution for model parameter $m_i$ only if the forward model $F_i(T; \varphi)$ is a linear function of T. This is not the case in general. In principle, both electromagnetic data, potential-field data and seismic data may be utilised. However, in this case, only electric conductivity $m_1=\sigma$ (or its inverse; resistivity) and density $m_2=\rho$ were utilized. The corresponding rock physics relations are denoted $F_1(T;\varphi)=\sigma(T;\varphi)$ and $F_2(T;\varphi)=\rho(T;\varphi)$.

Electric conductivity (or resistivity) is the geophysical parameter that has the most direct response to temperature variations. The rock physics model for conductivity $\sigma(T;\varphi)$ was designed as a fraction-weighted parallel coupling of (1) non-porous (dry) basaltic rock, (2) clay minerals from hydrothermal alterations and (3) fractures filled with water (brine). The temperature dependence of basaltic rocks was obtained by log-linear regression of conductivity vs. inverse temperature 1/T, using experimental data. The core measurements suggested that the temperature dependence of conductivity of dry basalt $\sigma_a$ (T) is given approximately by the sum of two Boltzmann distributions (Arrhenius equations)

$$\sigma_g(T) = \sigma_1 e^{-E_1/k_B T} + \sigma_2 e^{-E_2/k_B T} \tag{13}$$

where $k_B$ is the Boltzmann constant, and $\sigma_j$ and $E_j$ (for j=1,2) are calibration parameters. $E_j$ play the role of activation energies for two temperature-dependent conduction mechanisms.

The conductivity of the clay was modeled using the familiar Waxman-Smits equation. Particularly important was to account for the cation-exchange effect in smectite, at relatively shallow depth and low temperatures, below 220° C. The porosity of the basalt was assumed to be dominated by fractures. The fracture conductivity was approximated by the relation published by Brace et al. (Brace, W. F., Orange, A. S., and Madden, T. R., 1965. The effect of pressure on the electrical resistivity of water-saturated crystalline rocks: J. Geophys. Res., 70, 5669-5678), with temperature-dependent water conductivity.

The rock-physics model for density $\rho(T;\varphi)$ was constructed in a similar way, using the relations presented by Hacker et al (Hacker, B. R, Abers, G. A., and Peacock, S. M., 2003. Subduction factory 1. Theoretical mineralogy, densities, seismic wave speeds and H2O contents: J. Geophys. Res., 108 (B1), 2029), and temperature-dependent water density in the fractures.

The drill-site selected for the IDDP-2 well was mapped by a 3D MT survey, with receivers distributed on an approximately 5×5 km² grid. 3D MT inversion was performed using the minimum-norm (data-space Hessian) 3D MT inversion of Siripunvaraporn et al. (Siripunvaraporn, W., G. Egbert, Y. Lenbury, and M. Uyeshima, 2005, Three-dimensional magnetotelluric inversion: Data-space method: Physics of the Earth and Planetary Interiors, 150, 3-15). Inversion of transient electromagnetic (TEM) data was used to obtain independent estimates of shallow resistivity, and to correct the MT data for static shifts, caused by near-surface galvanic currents. The details of the MT and TEM inversion were described by Karlsdóttir et al. (Karlsdóttir, R., Árnason, K., and Vilhjálmsson, A. M., 2012. Reykjanes Geothermal Area, Southwest Iceland. 3D Inversion of MT and TEM Data: Iceland Geosurvey íSOR-2012/059).

A shallow low-resistivity zone, at depth less than 1.5 km, was caused by the high cation-exchange capacity of smectite. At temperatures between 220° C. and 260° C., chlorite with higher resistivity, becomes the dominating alteration mineral. At depths larger than 3 km, a high-resistivity zone, assumed to be associated with sheeted dykes and diabase, was observed. The target of the IDDP-2 well was a zone of reduced resistivity within the high resistive zone, between 3 and 5 km depth.

Gravity surveying had been performed on the Reykjanes Peninsula for the purpose of monitoring the subsidence of the spreading ridge by time-lapse gravimetry. The most recent gravity survey, from 2014, was utilized for temperature prediction at the IDDP-2 drill site. The local gravity data was processed by complete Bouguer corrections, including terrain correction. The local data was then merged with a regional Bouguer anomaly map, to obtain sufficient aperture (15×15 km²) for 3D inversion.

Gravity inversion is generally ill-posed, and needs to be regularized. Therefore, a density model for the upper zone, down to approximately 2500 m, was built using borehole data from the wells in the Reykjanes geothermal area. The gravity response of the upper zone was modeled and subtracted, to isolate the gravity anomaly associated with the deeper zone of interest. The residual was then inverted for density in the deeper zone, from 2500 m to 7000 m. A Marquardt-Levenberg type 3D inversion scheme, implemented in Matlab, was used to perform the gravity inversion (Hokstad, K., Alasonati Tašárová, Z., Clark, S. A., Kyrkjebø, R., Duffaut, K., and Pichler, C., 2017, Heat production and heat flow from geophysical data: Submitted to Norwegian Journal of Geology).

Also, a porosity vs depth trend is needed for the rock-physics inversion. Little hard information about porosity in the Reykjanes geothermal area had been published. Data for the porosity was only known for the upper ca 2000 m. Assuming an exponential trend, neutron capture logs from vintage wells were used to estimate a porosity trend. The porosity trend was calibrated such that the rock-physics model reproduced approximately the temperature-corrected (Arp's formula) resistivity log from the RN-15 well, given measured formation temperature from the 2010 maintenance stop. The temperature-corrected resistivity log was in good agreement with the resistivity trend from 3D MT inversion. Also, a synthetic density log was computed and used to calibrate the absolute level of the density cube from 3D gravity inversion. In this way, a set of subsurface parameters a, p and F consistent with the rock physics models down to 2.5 km depth were obtained.

The resistivity model from MT inversion, the density model from gravity inversion, and the porosity vs. depth trend, were input to the Bayesian inversion scheme. The prior model for temperature vs. depth was chosen close to the boiling curve down to 2.5 km depth, and then increasing with 80° C./km. The inversion proved to be quite robust, and the value of the prior temperature was not important. Hence, a relatively vague prior, with variance of 400° C. could be used.

From the multigeophysical inversion, the well was predicted to reach supercritical conditions (T>400° C.) at approximately 4 km depth. The predrill estimate for the planned total depth of the well was 513±62° C. at 5 km vertical depth. Reykjanes is in an active sea-floor spreading zone, and earthquakes of magnitude 2 and less occur regularly. The earthquakes are expected to diminish in the ductile zone, starting at about 600° C. This was in fair agreement with the predrill temperature predictions. The estimated source locations of all earthquakes (prior to drilling) were above the 500° C. isotherm from the inversion.

The drilling of the IDDP-2 well started in August 2016. During the drilling period, the temperature in the well was measured regularly. Also, wireline logging of resistivity, neutron capture and gamma ray was performed acquired tripping at 2900 m and 3450 m measured depth (MD). Cold water was used as drilling fluid. Because of the cooling effect of the injected water, the resistivity logs do not record true formation resistivity, Using measured temperatures, neutron logs, and tie to the RN-15 logs in overlapping intervals, the resistivity logs were adjusted to approximately represent the formation resistivity trend, Different correction methods were used, including empirical re-scaling, and corrections based on analytical solutions to the heat equation in cylindrical coordinates. The temperature-corrected resistivity log was used to rerun the inversion for temperature along the planned well path. The results were uncertain due to the uncertainty involved in the log corrections. However, the while-drilling updates indicated that the formation temperature was 50-100° C. higher than the predrill prediction.

A number of core runs were performed to collect samples of the drilled rocks. The cores were used to identify alteration minerals, and to obtain rough constraints on maximum temperatures. The core runs, however, covered only a very small part of the drilled well section.

The described well section and core descriptions, together with the temperature estimates from the multigeophysical inversion, were used to construct, and continuously update a geological model for the IDDP-2 borehole.

Combined data in the geological model supported the temperature predictions suggested by multigeophysical inversion. Several changes in rock parameters had been described to occur during the major temperature changes, most notably reaching of 400° C. and 500° C. further supporting temperature predictions made for the Reykjanes geothermal area.

The drilling of the well was completed late December 2016. In early January 2017, the water injection was reduced for two days, and a new temperature log was run, measuring 427° C. at 4626 m MD. The kinks in the measured temperature curves were associated with high-permeability loss zones.

In summary, the temperatures estimated from the inversion method were in good agreement with the most recent temperature log (acquired 3 Jan. 2017), and with geochemical indications from alteration minerals, and with changes in rock parameters. The method is based on inversion of geophysical data, followed by Bayesian rock physics inversion for direct temperature estimation. The geophysical parameter that responds most directly to changes in formation temperature is electric conductivity (or resistivity). MT data are well suited due to the wide range of frequencies in the source field (i.e. the interaction between the sun and earth magnetic field). The low-frequency part of the source field is needed to image targets down to 5-6 km depth. However, due to the electromagnetic skin effect, only a low-resolution image can be obtained.

Density from gravity inversion is useful to reduce the posterior uncertainty of the method. Also a porosity vs depth trends is important input to the rock physics inversion, A relative reduction of electric resistivity and density can be caused by either increased porosity or increased temperature. Hence, there is an inherent ambiguity in the inversion. Magnetic susceptibility and seismic P-wave and S-wave velocities can also be utilized, but this was not done in this case. The method has been calibrated for and demonstrated on mid-oceanic ridge basalts (MORE). The method may be applied to other tectonic and geological settings following recalibration of the rock physics models used in the Bayesian inversion.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. A method of drilling a geothermal well, the method comprising calculating a temperature and/or porosity of a geological structure, wherein there is provided at least two geophysical parameters of the geological structure, the at least two geophysical parameters comprising magnetic susceptibility or magnetic remanence, the method of calculating the temperature and/or porosity of a geological structure comprising:
   gathering at least two types of geophysical data of the geological structure, the at least two types of geophysical data comprising electromagnetic data or magnetic data;
   inverting the at least two types of geophysical data to calculate the at least two geophysical parameters;
   inverting the at least two geophysical parameters to estimate the temperature and/or porosity of the geological structure; and
   using the calculated temperature and/or porosity in a decision-making process for the drilling of the geothermal well, wherein the decision-making process comprises deciding where to drill, in which direction to drill, to which depth to drill, and/or whether to stop drilling based on the calculated temperature and/or porosity;
   wherein the inverting step comprises using one or more models in which there is statistical independence between the at least two geophysical parameters and statistical dependence between each respective geophysical parameter and the temperature and/or porosity of the geological structure, the one or more models comprising a Bayesian network describing a relationship between the at least two geophysical parameters and the temperature and/or porosity of the geological structure;
   the method further comprising drilling or stopping drilling the geothermal well based on a result of the decision-making process.

2. A method as claimed in claim 1 comprising using both the calculated temperature and the calculated porosity in the decision-making process for the drilling of the geothermal well.

3. A method as claimed in claim 1, wherein the at least two geophysical parameters are any geophysical parameters which are dependent on temperature and/or porosity, such as density, seismic velocity, magnetic susceptibility, electrical conductivity, electrical resistivity or magnetic remanence.

4. A method as claimed in claim 3, wherein the at least two geophysical parameters comprise electrical conductivity.

5. A method as claimed in claim 1, wherein the inverting step comprises using respective forward models for each respective geophysical parameter, the forward models each defining a relationship between the respective geophysical parameter and the temperature and/or porosity of the geological structure.

6. A method as claimed in claim 5, wherein the only variable(s) in each of the respective forward models is the temperature and/or porosity of the geological structure.

7. A method as claimed in claim 5, wherein there is provided calibration data comprising at least one measurement of each of the at least two geophysical parameters and the temperature and/or porosity of the geological structure, and wherein the method comprises optimising the respective forward models based on the calibration data.

8. A method as claimed in claim 1, wherein there is provided at least two types of geophysical data of the geological structure, the method comprising inverting the at least two types of geophysical data respectively to calculate the at least two respective geophysical parameter.

9. A method as claimed in claim 8, comprising obtaining the geophysical data.

10. A method as claimed in claim 1, wherein the method is for calculating the temperature of the geological structure, and wherein porosity data is included as a parameter in the inversion.

11. A method as claimed in claim 1, wherein the method is for calculating the porosity of the geological structure, and wherein temperature data is included as a parameter in the inversion.

12. A method of calculating a spatially-dependent function of temperature and/or porosity of a geological structure, comprising performing the method of claim 1 point-wise for a plurality of points over the geological structure to calculate the temperature and/or porosity at each of the plurality of points, and constructing the spatially dependent function of temperature and/or porosity.

13. A method as claimed in claim 1, wherein the temperature and/or porosity is found in three dimensions.

14. A method as claimed in claim 1, comprising:
   acquiring new geophysical data during or after drilling;
   inverting said new geophysical data to find corresponding new geophysical parameters;
   inverting said new geophysical parameters to provide updated estimates of the temperature and/or porosity.

15. A method of harnessing geothermal energy comprising the method as claimed in claim 1, and producing geothermal energy from the geothermal well.

16. A non-transitory computer program product comprising computer readable instructions that, when run on a computer, is configured to cause a processer to perform the method of claim 1.

17. The method as claimed in claim 14, further comprising using the updated estimates of the temperature and/or porosity in the decision-making process for the drilling of the geothermal well.

18. The method of claim 1, wherein the geophysical data comprise pre-drilling geophysical data.

19. The method of claim 18, wherein the pre-drilling geophysical data are used to provide a pre-drilling estimate of the temperature and/or porosity of the geological structure.

20. The method of claim 18, further comprising acquiring the pre-drilling geophysical data prior to drilling.

21. The method of claim 14, further comprising acquiring the geophysical data during drilling through one or more well logs in a partially-drilled well.

22. The method of claim 14, further comprising acquiring the geophysical data after the drilling of a well through one or more well logs in the well.

23. The method of claim 14, wherein the data acquired during or after the drilling comprises temperature data.

24. The method of claim 23, comprising using the temperature data to update previous temperature estimates by offering a further constraint to the inverting.

25. The method of claim 1, further comprising at least one of:
   calculating the temperature and/or porosity prior to a drilling operation;
   calculating the temperature and/or porosity during a drilling operation; and
   calculating the temperature and/or porosity after a well has been drilled.

* * * * *